(12) United States Patent
Hu et al.

(10) Patent No.: US 12,372,611 B2
(45) Date of Patent: Jul. 29, 2025

(54) SENSOR CALIBRATION METHOD AND APPARATUS

(71) Applicant: SHENZHEN YINWANG INTELLIGENT TECHNOLOGIES CO., LTD., Shenzhen (CN)

(72) Inventors: Bin Hu, Shanghai (CN); Zhenmei Wan, Shenzhen (CN); Jing Yang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 599 days.

(21) Appl. No.: 17/704,693

(22) Filed: Mar. 25, 2022

(65) Prior Publication Data

US 2022/0214424 A1    Jul. 7, 2022

Related U.S. Application Data

(63) Continuation of application No. PCT/CN2020/116143, filed on Sep. 18, 2020.

(30) Foreign Application Priority Data

Sep. 25, 2019  (CN) .......................... 201910913472.9

(51) Int. Cl.
  *G01S 7/40*    (2006.01)
  *G01S 13/86*   (2006.01)
  *G01S 13/931*  (2020.01)
  *H04N 17/00*   (2006.01)

(52) U.S. Cl.
  CPC .............. *G01S 7/40* (2013.01); *G01S 13/867* (2013.01); *G01S 13/931* (2013.01); *H04N 17/002* (2013.01)

(58) Field of Classification Search
  CPC ........ G01S 7/40; G01S 13/867; G01S 13/931; H04N 17/002
  See application file for complete search history.

(56) References Cited

U.S. PATENT DOCUMENTS

| | | | | |
|---|---|---|---|---|
| 2017/0307730 A1* | 10/2017 | Baba | ...................... | G08G 1/166 |
| 2018/0113195 A1* | 4/2018 | Bialer | ...................... | G01S 13/86 |
| 2018/0259621 A1 | 9/2018 | Yamazaki et al. | | |
| 2018/0267142 A1* | 9/2018 | Motoyama | ............ | G01S 7/4026 |

(Continued)

FOREIGN PATENT DOCUMENTS

| | | | |
|---|---|---|---|
| CN | 101231340 A | | 7/2008 |
| CN | 101345890 A | * | 1/2009 |

(Continued)

*Primary Examiner* — William Kelleher
*Assistant Examiner* — Noah Yi Min Zhu
(74) *Attorney, Agent, or Firm* — Conley Rose, P.C.

(57) ABSTRACT

A sensor calibration method includes: location information of a target detected by a radar is matched against map information to determine a calibration value of the radar, and then location information of a pixel of a target corresponding to the camera in a global coordinate system is determined based on calibrated radar measurement data so as to further determine a calibration value of the camera. In this way, for a roadside sensing system that includes the single radar and the single camera, manual field calibration is no longer required.

20 Claims, 7 Drawing Sheets

(56) References Cited

U.S. PATENT DOCUMENTS

| | | | |
|---|---|---|---|
| 2020/0143710 A1 | 5/2020 | Zhou et al. | |
| 2020/0184236 A1* | 6/2020 | Aguiar | G02B 6/0055 |
| 2020/0219264 A1* | 7/2020 | Brunner | G01S 7/4808 |
| 2020/0326410 A1* | 10/2020 | Vu | G01S 13/867 |
| 2021/0033722 A1* | 2/2021 | Søndergaard | G01S 13/867 |
| 2021/0231773 A1* | 7/2021 | Zhu | G01S 7/4026 |
| 2021/0239793 A1* | 8/2021 | Yu | G01S 7/40 |
| 2022/0180561 A1* | 6/2022 | Hiraishi | G01S 7/497 |

FOREIGN PATENT DOCUMENTS

| | | | | |
|---|---|---|---|---|
| CN | 107976657 A | | 5/2018 | |
| CN | 108519605 A | | 9/2018 | |
| CN | 108596979 A | | 9/2018 | |
| CN | 109061610 A | | 12/2018 | |
| CN | 109215083 A | | 1/2019 | |
| CN | 109360228 A | | 2/2019 | |
| CN | 109490890 A | * | 3/2019 | G01S 13/867 |
| CN | 109901139 A | | 6/2019 | |
| CN | 110148180 A | | 8/2019 | |
| CN | 110243380 A | | 9/2019 | |
| KR | 20190102665 A | | 9/2019 | |
| WO | 2016176487 A1 | | 11/2016 | |
| WO | WO-2020192464 A1 | * | 10/2020 | G06T 7/80 |

\* cited by examiner

SENSOR CALIBRATION METHOD AND APPARATUS

CROSS-REFERENCE TO RELATED APPLICATIONS

This is a continuation of International Patent Application No. PCT/CN2020/116143 filed on Sep. 18, 2020, which claims priority to Chinese Patent Application No. 201910913472.9 filed on Sep. 25, 2019. The disclosures of the aforementioned applications are hereby incorporated by reference in their entireties.

TECHNICAL FIELD

This application relates to the field of automatic driving technologies, and in particular, to a sensor space calibration method and apparatus.

BACKGROUND

With development of society, intelligent vehicles are gradually entering people's daily life. Sensors play a quite important role in assisted driving and automatic driving of the intelligent vehicles. A roadside monitoring system can effectively monitor targets in a front coverage area by using active sensors such as a distance sensor and an image sensor. Using multi-sensor fusion is a development trend. It greatly improves an environment sensing capability of a roadside sensing station. With reference to a vehicle-to-everything (V2X) technology, overall road safety performance can be improved. The fusion of the distance sensor and the image sensor can give play to advantages of the two sensors, and has obvious advantages in terms of obtaining environment information and performing target identification.

In data fusion processing of a multi-sensor detection system, a unified coordinate system needs to be provided, so as to ensure that data obtained by a plurality of sensors can have a unified reference standard, so that the data of the plurality of sensors can be converted to each other. Therefore, the distance sensor and the image sensor should be spatially self-calibrated before the two sensors are used for data fusion processing. Currently, a multi-radar and/or multi-camera joint calibration processing manner is mainly used in calibration solutions for a camera and a millimeter wave radar. However, currently, for a calibration solution for a single-radar and single-camera sensing system, extra camera assistance or manual field calibration need to be used, and efficiency is relatively low.

Therefore, it is urgently necessary to provide a calibration solution for a single-radar and single-camera sensing system to resolve a problem that calibration efficiency of the single-radar and single-camera sensing system is relatively low.

SUMMARY

This application provides a sensor calibration method and apparatus, which can improve calibration efficiency of a single-radar and single-camera sensing system.

According to a first aspect, a sensor calibration method is provided. In an example, the method may be applied to a roadside sensing system, and the roadside sensing system includes a single-radar sensor, a camera, and a fusion processing module. The radar and the camera are disposed on a roadside, and the fusion processing module may be disposed on a roadside or in the cloud. The method may be executed by the fusion processing module. In an example, the camera in this embodiment of this application is a monocular camera.

In this method, first radar measurement data of a first target may be obtained first, and a calibration value of the radar sensor is determined based on map information and the first radar measurement data. Then, first radar calibration measurement data of a second target may be determined based on second radar measurement data of the second target and the calibration value of the radar sensor. Then, first camera measurement data of the second target is obtained, and a calibration value of a camera sensor is determined based on the first radar calibration measurement data and the first camera measurement data.

Therefore, in this embodiment of this application, location information of a target detected by the radar is matched against the map information to determine the calibration value of the radar sensor, and then location information of a pixel of a target corresponding to the camera in the global coordinate system may be determined based on calibrated radar measurement data, that is, radar calibration measurement data, so as to further determine the calibration value of the camera sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

With reference to the first aspect, in some implementations of the first aspect, a fitting straight line track of the first target may be determined based on the foregoing first radar measurement data, and then a first slope of the fitting straight line track of the first target is determined. Then, a second slope of a first road reference target in a world coordinate system may be determined based on the map information, where the first road reference target is corresponding to the fitting straight line track of the first target. Then, the calibration value of the radar sensor may be determined based on the first slope and the second slope.

Herein, when the first target is a stationary point target, the first radar measurement data may be location information of a plurality of first targets. When the first target is a moving target, the first radar measurement data may be location information of a plurality of moving positions of the first target.

In this embodiment of this application, the first slope is a slope of the fitting straight line track of the first target in a local coordinate system of the radar, and the second slope is a slope of the road reference target in a global coordinate system. In an example, when the map information is a GPS map, the global coordinate system may be the world coordinate system.

In an example, an angle of arrival (AOA) of the first target in the local coordinate system of the radar may be determined based on the first slope. The AOA may be represented as $\theta_r$. An AOA of the first target in the world coordinate system is determined based on the second slope. For example, the AOA may be represented as $\theta_l$. In this case, the calibration value $\Delta\theta$ of the radar sensor may be represented as: $\Delta\theta = \theta_l - \theta_r$.

Therefore, in this embodiment of this application, the first slope of the fitting straight line track of the first target is obtained, the second slope of the first road, in the world reference system, corresponding to the fitting straight line track of the first target is obtained, and the calibration value of the radar sensor is determined based on the first slope and the second slope. Therefore, according to the sensor space calibration solution provided in the embodiment of this application, for a sensing system that includes a single radar and a monocular camera, manual field calibration is no longer required, which can effectively improve calibration efficiency of sensors in the sensing system.

With reference to the first aspect, in some implementations of the first aspect, k first radar measurement values corresponding to k first targets may be obtained. The k first targets are corresponding to a first road reference target in the map information, and k is an integer greater than or equal to 2. Then, k fitting straight line tracks corresponding to the k first targets are determined based on n first radar measurement values corresponding to the k first targets, and an average value of k first slopes corresponding to the k fitting straight line tracks is determined.

Then, a second slope of the first road reference target in the world coordinate system may be determined based on the map information. Then, the calibration value of the radar sensor may be determined based on the average value of the k first slopes and the second slope.

In an example, an AOA of the first target in the local coordinate system of the radar may be determined based on the average value of the k first slopes. The AOA may be represented as $\tilde{\theta}_r$. An AOA of the first target in the world coordinate system is determined based on the second slope. For example, the AOA may be represented as $\theta_l$. In this case, the calibration value $\Delta\theta$ of the radar sensor may be represented as: $\Delta\theta = \theta_l - \theta_r$.

Therefore, in this embodiment of this application, the average value of the plurality of first slopes is determined after location information of the first target is measured for a plurality of times, and the calibration value of the radar sensor is determined based on the average value of the first slopes, thereby improving precision of the calibration value of the radar sensor.

With reference to the first aspect, in some implementations of the first aspect, location information of the second target in the world coordinate system may be determined based on the first radar calibration measurement data. Then, the calibration value of the camera sensor is determined based on the first camera measurement data and the location information of the second target in the world coordinate system. In an example, calibration point coordinates in the global coordinate system that are corresponding to a pixel of the second target in the local coordinate system of the camera are the location information of the second target in the world coordinate system.

In an example, the first radar calibration measurement data may be an AOA that is of the second target in the global coordinate system and obtained through calibration performed on an AOA measured by the radar. For example, when the AOA of the second target in the local coordinate system of the radar that is measured by the radar is $\hat{\varphi}$, the first radar calibration measurement data of the second target may be $(\hat{\varphi}+\Delta\theta)$.

In some possible implementations, for a second target that appears at different moments in a same location in images obtained by the camera, location information that is of the second target appearing at the different moments and observed by the radar may be determined, and an average value of the plurality of pieces of location information is determined. Then, first radar calibration measurement data of the second target is determined based on the average value of the plurality of pieces of location information. Herein, the location information is location information of the second target in the local coordinate system of the radar.

In an example, the location information may include, for example, a distance and an AOA.

It should be noted that, because the plurality of second targets are targets that appear at different moments in the same location obtained by the camera, camera measurement data corresponding to the plurality of second targets is the same.

Therefore, in this embodiment of this application, location information of the second target is measured for a plurality of times, and the average value of the location information of the plurality of second targets is determined. Then, first radar calibration measurement data of the second targets is determined based on the average value of the location information of the plurality of second targets. This can improve precision of radar calibration measurement data.

With reference to the first aspect, in some implementations of the first aspect, a plurality of pieces of first radar calibration measurement data corresponding to the second target that appears at the different moments in the same location in the images obtained by the camera may be further obtained. Then, a plurality of pieces of location information of the plurality of second targets in the world coordinate system may be determined based on the plurality of pieces of first radar calibration measurement data, and an average value of the plurality of pieces of location information may be determined. Then, the calibration value of the camera sensor may be determined based on the average value of the plurality of pieces of location information and first camera measurement data corresponding to the plurality of second targets.

For example, h pieces of first radar calibration measurement data corresponding to h second targets and h pieces of first camera measurement data of the h second targets may be obtained. The first camera measurement data of the h second targets is the same, and h is an integer greater than or equal to 2.

Then, h pieces of location information of the h second targets in the world coordinate system are determined based on the h pieces of first radar calibration measurement data of the h second targets, and an average value of the h pieces of location information of the h second targets is determined.

Then, the calibration value of the camera sensor is determined based on the average value of the h pieces of location information of the h second targets and the h pieces of first camera measurement data of the h second targets.

Therefore, in this embodiment of this application, location information of the second target is measured for a plurality of times, a plurality of pieces of location information in the world coordinate system that are corresponding to the location information of the plurality of second targets are determined, and then an average value of the plurality of pieces of location information of the plurality of second targets in the world coordinate system is determined. Then, the calibration value of the camera sensor is determined based on the average value. This can improve precision of the calibration value of the camera sensor.

With reference to the first aspect, in some implementations of the first aspect, travelling data of the foregoing first target collected by the camera sensor may be obtained, and then radar measurement data collected by the radar sensor is searched for first radar measurement data that matches the travelling data.

In this way, the first radar measurement data corresponding to the moving target may be obtained, and then the calibration value of the radar sensor may be determined based on the map information and the first radar measurement data corresponding to the moving target.

In some possible implementations, the first target and the second target may be same objects, but implementation of this application is not limited thereto.

In this embodiment of this application, after determining the calibration value of the radar sensor, the fusion processing module may send the calibration value of the radar sensor to the radar. After determining the calibration value of the camera sensor, the fusion processing module may send the calibration value of the camera sensor to the camera.

According to a second aspect, a sensor calibration method is provided. In an example, the method may be applied to a roadside sensing system, and the roadside sensing system includes a single-radar sensor, a camera, and a fusion processing module. The radar and the camera are disposed on a roadside, and the fusion processing module may be disposed on a roadside or in the cloud. The method may be performed by the camera. In an example, the camera in this embodiment of this application is a monocular camera.

In this method, a calibration value of a camera sensor sent by the fusion processing module may be received, where the calibration value of the camera sensor is obtained based on first radar calibration measurement data of a second target and first camera measurement data of the second target, and the first radar calibration measurement data is obtained based on second radar measurement data of the second target and a calibration value of the radar sensor. Then, a measurement parameter of the camera sensor may be calibrated based on the calibration value of the camera sensor.

Therefore, in this embodiment of this application, the camera may receive the calibration value of the camera sensor sent by the fusion processing module, and then may calibrate the measurement parameter of the camera sensor based on the calibration value of the camera sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

With reference to the second aspect, in some implementations of the second aspect, camera measurement data of a plurality of targets may be further obtained, and a first target that meets a preset reporting condition is determined in the plurality of targets based on the camera measurement data. Then, travelling data of the first target is obtained, and the travelling data of the first target is sent to the fusion processing module. The travelling data is used to indicate the fusion module to search radar measurement data collected by the radar sensor for first radar measurement data that is of the first target and matches the travelling data.

In an example, the preset reporting condition is that vehicles in a scene picture photographed by the camera are sparse, for example, only one vehicle exists. In this case, the vehicle may be used as the first target.

According to a third aspect, a sensor calibration method is provided. In an example, the method may be applied to a roadside sensing system, and the roadside sensing system includes a single-radar sensor, a camera, and a fusion processing module. The radar and the camera are disposed on a roadside, and the fusion processing module may be disposed on a roadside or in the cloud. The method may be performed by the radar. In an example, the camera in this embodiment of this application is a monocular camera.

In this method, a calibration value of the radar sensor sent by the fusion processing module may be received, and the calibration value of the radar sensor is obtained based on first radar measurement data of a first target and map data. Then, a measurement parameter of the radar sensor is calibrated based on the calibration value of the radar sensor.

Therefore, in this embodiment of this application, the radar may receive the calibration value of the radar sensor sent by the fusion processing module, and then may calibrate the measurement parameter of the radar sensor based on the calibration value of the radar sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

According to a fourth aspect, an embodiment of this application provides a sensor calibration apparatus, configured to perform the method in any one of the first aspect or the possible implementations of the first aspect. Specifically, the apparatus includes a module configured to perform the method in any one of the first aspect or the possible implementations of the first aspect. The apparatus includes an obtaining unit and a determining unit.

The obtaining unit is configured to obtain first radar measurement data of a first target.

The determining unit is configured to determine a calibration value of a radar sensor based on map information and the first radar measurement data.

The determining unit is further configured to determine first radar calibration measurement data of a second target, where the first radar calibration measurement data is obtained based on second radar measurement data of the second target and the calibration value of the radar sensor.

The obtaining unit is further configured to obtain first camera measurement data of the second target.

The determining unit is further configured to determine a calibration value of a camera sensor based on the first radar calibration measurement data and the first camera measurement data.

With reference to the fourth aspect, in some implementations of the fourth aspect, the determining unit is specifically configured to: determine a fitting straight line track of the first target based on the first radar measurement data, and determine a first slope of the fitting straight line track of the first target. Then, a second slope of a first road reference target in a world coordinate system is determined based on the map information, where the first road reference target is corresponding to the fitting straight line track of the first target. Then, the calibration value of the radar sensor is determined based on the first slope and the second slope.

With reference to the fourth aspect, in some implementations of the fourth aspect, the determining unit is specifically configured to obtain k first radar measurement values corresponding to k first targets. The k first targets are corresponding to the first road reference target in the map information, and k is an integer greater than or equal to 2. Then, k fitting straight line tracks corresponding to the k first targets are determined based on n first radar measurement values corresponding to the k first targets. Then, an average value of k first slopes corresponding to the k fitting straight line tracks is determined. Then, a second slope of the first road reference target in a world coordinate system is determined based on the map information. Then, the calibration value of the radar sensor is determined based on the average value of the k first slopes and the second slope.

With reference to the fourth aspect, in some implementations of the fourth aspect, the determining unit is specifically configured to determine location information of the second target in the world coordinate system based on the first radar calibration measurement data. Then, the calibration value of the camera sensor is determined based on the first camera measurement data and the location information of the second target in the world coordinate system.

With reference to the fourth aspect, in some implementations of the fourth aspect, the determining unit is specifically configured to obtain h pieces of first radar calibration measurement data corresponding to h second targets and h pieces of first camera measurement data of the h second targets, where the first camera measurement data of the h second targets is the same, and h is an integer greater than or equal to 2. Then, h pieces of location information of the h second targets in the world coordinate system are determined based on the h pieces of first radar calibration measurement data of the h second targets. Then, an average value of the h pieces of location information of the h second targets is determined. Then, the calibration value of the camera sensor is determined based on the average value of the h pieces of location information of the h second targets and the h pieces of first camera measurement data of the h second targets.

With reference to the fourth aspect, in some implementations of the fourth aspect, the obtaining unit is specifically configured to: obtain travelling data of the first target collected by the camera sensor; and search radar measurement data collected by the radar sensor for the first radar measurement data that matches the travelling data.

According to a fifth aspect, an embodiment of this application provides a sensor calibration apparatus, configured to perform the method in any one of the second aspect or the possible implementations of the second aspect. Specifically, the apparatus includes a module configured to perform the method in any one of the second aspect or the possible implementations of the second aspect. The apparatus includes a receiving unit and a processing unit.

The receiving unit is configured to receive a calibration value of a camera sensor sent by a fusion processing module, where the calibration value of the camera sensor is obtained based on first radar calibration measurement data of a second target and first camera measurement data of the second target, and the first radar calibration measurement data is obtained based on second radar measurement data of the second target and a calibration value of the radar sensor.

The processing unit is configured to calibrate a measurement parameter of the camera sensor based on the calibration value of the camera sensor.

With reference to the fifth aspect, in some possible implementations of the fifth aspect, the apparatus further includes an obtaining unit, configured to obtain camera measurement data of a plurality of targets. Then, the processing unit is further configured to determine, from the plurality of targets based on the camera measurement data of the plurality of targets that is obtained by the obtaining unit, a first target that meets a preset reporting condition.

The obtaining unit is further configured to obtain travelling data of the first target.

The apparatus further includes a sending unit, configured to send the travelling data of the first target to the fusion processing module, where the travelling data is used to indicate the fusion module to search radar measurement data collected by the radar sensor for first radar measurement data that is of the first target and matches the travelling data.

According to a sixth aspect, an embodiment of this application provides a sensor calibration apparatus, configured to perform the method in any one of the third aspect or the possible implementations of the third aspect. Specifically, the apparatus includes a module configured to perform the method in any one of the third aspect or the possible implementations of the second aspect. The apparatus includes a receiving unit and a processing unit.

The receiving unit is configured to receive a calibration value of a radar sensor sent by a fusion processing module, where the calibration value of the radar sensor is obtained based on first radar measurement data of a first target and map data.

The processing unit is configured to calibrate a measurement parameter of the radar sensor based on the calibration value of the radar sensor.

According to a seventh aspect, an embodiment of this application provides a sensor calibration apparatus, including a memory and a processor. The memory is configured to store instructions. The processor is configured to execute the instructions stored in the memory. When the processor executes the instructions stored in the memory, the execution enables the processor to perform the method in any one of the first aspect or the possible implementations of the first aspect.

According to an eighth aspect, an embodiment of this application provides a sensor calibration apparatus, including a memory and a processor. The memory is configured to store instructions. The processor is configured to execute the instructions stored in the memory. When the processor executes the instructions stored in the memory, the execution enables the processor to perform the method in any one of the second aspect or the possible implementations of the second aspect.

According to a ninth aspect, an embodiment of this application provides a sensor calibration apparatus, including a memory and a processor. The memory is configured to store instructions. The processor is configured to execute the instructions stored in the memory. When the processor executes the instructions stored in the memory, the execution enables the processor to perform the method in any one of the third aspect or the possible implementations of the third aspect.

According to a tenth aspect, an embodiment of this application provides a computer-readable medium, configured to store a computer program. The computer program includes instructions used to perform the method in any one of the first aspect or the possible implementations of the first aspect, or instructions used to perform the method in any one of the second aspect or the possible implementations of the second aspect, or instructions used to perform the method in any one of the third aspect or the possible implementations of the third aspect.

According to an eleventh aspect, a computer program product is provided. The computer program product includes instructions. When the instructions are run on a computer, the computer is enabled to implement the method in any one of the first aspect and the possible implementations of the first aspect, the method in any one of the second aspect and the possible implementations of the second aspect, or the method in any one of the third aspect and the possible implementations of the third aspect.

According to a twelfth aspect, a sensor calibration system is provided, including the sensor calibration apparatus in the fourth aspect, the sensor calibration apparatus in the fifth aspect, and the sensor calibration apparatus in the sixth aspect.

According to a thirteenth aspect, a sensor calibration system is provided, including the sensor calibration apparatus in the seventh aspect, the sensor calibration apparatus in the eighth aspect, and the sensor calibration apparatus in the ninth aspect.

According to a fourteenth aspect, a chip is provided, including a processor and a communications interface. The processor is configured to invoke instructions from the communications interface and run the instructions. When the processor executes the instructions, the method in any one of the first aspect to the third aspect or the possible implementations of the first aspect to the third aspect is implemented.

DESCRIPTION OF EMBODIMENTS

The following describes the technical solutions in this application with reference to the accompanying drawings.

Figure 1:
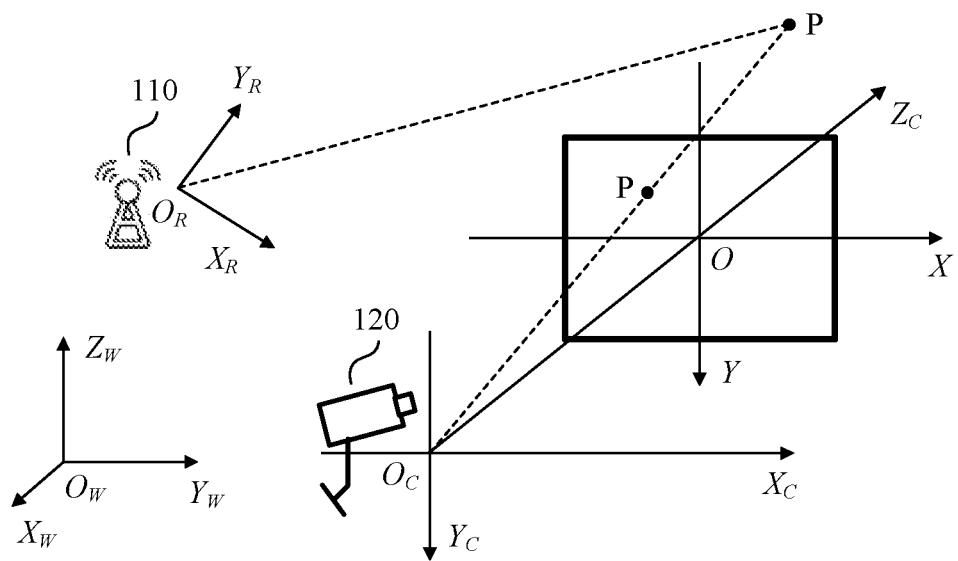
FIG. 1 is a schematic diagram of location conversion of a plurality of sensors.

First, a process of converting locations of a plurality of sensors to a unified coordinate system is described with reference to FIG. 1. In an example, the plurality of sensors include, for example, a radar 110 and a camera 120. As shown in FIG. 1, the unified coordinate system is, for example, a global coordinate system $O_W-X_WY_WZ_W$. Using a target P as an example, the radar 110 may obtain location data of the target P in a local coordinate system $(O_R-X_RY_R)$ of the radar. The location data includes a distance $(O_RP)$ between the target P and the radar and an AOA. Based on a calibration parameter of the radar 110, coordinate system conversion may be performed on the location data of the target P, that is, the target P is projected from the local coordinate system $O_R-X_RY_R$ to the global coordinate system $O_W-X_WY_WZ_W$, to obtain location data of the target P in the global coordinate system.

In an example, the calibration parameter of the radar 110 is, for example, a radar beam azimuth and/or radar location coordinates.

Continuing to use the target P as an example, the camera 120 can obtain pixel coordinates of the target P in a pixel coordinate system O–XY. In a process of converting the pixel coordinates of the target P to the global coordinate system $O_W-X_WY_WZ_W$, the target P needs to be first converted from the pixel coordinate system O–XY to a local coordinate system $O_C-X_CY_CZ_C$ of the camera 120, and then converted from the local coordinate system $O_C-X_CY_CZ_C$ of the camera 120 to the global coordinate system $O_W-X_WY_WZ_W$. Because the camera 120 cannot obtain distance information of the target P, in a coordinate system conversion process, a location of a pixel in the global coordinate system needs to be spatially calibrated.

In an example, a calibration parameter of the camera 120 is, for example, a conversion relationship between a location of a target in the local coordinate system of the camera 120 and a location of the target in the global coordinate system. For example, the conversion relationship may be specifically represented as a space conversion matrix. In some possible implementations, in a process of determining the calibration parameter of the camera 120, a location of a target in the local coordinate system of the camera and location coordinates of the target in the global coordinate system may be first obtained.

In some possible implementations, the global coordinate system may be a world coordinate system or an earth coordinate system. In this case, the location coordinates of the target in the global coordinate system may also be described as an actual location of the target.

For example, for a distance sensor such as a millimeter wave radar or a laser radar, calibration may be performed on each radar azimuth by using a distributed multi-radar joint calibration method. For another example, for an image sensor such as a camera, a binocular camera is mainly used to obtain spatial location information of a target by using a visual angle difference, so as to complete calibration of the binocular camera. However, currently, manual field calibration is mainly used for a single radar and a single camera, and efficiency is relatively low.

Based on this, an embodiment of this application provides a sensor space calibration solution, so that for a sensing system that includes a single radar and a monocular camera, manual field calibration is no longer required, which can effectively improve calibration efficiency of sensors in the sensing system.

Figure 2:
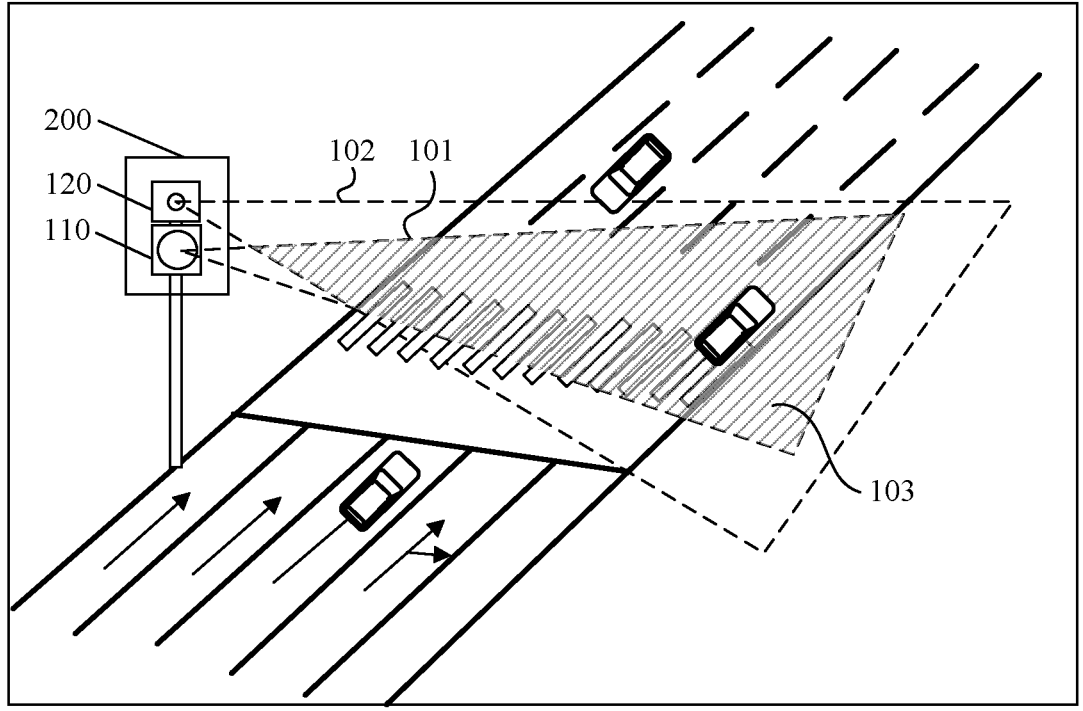
FIG. 2 is a schematic diagram of an application scenario applicable to an embodiment of this application.

FIG. 2 is a schematic diagram of an application scenario applicable to an embodiment of this application. As shown in FIG. 2, the sensing system 200 may be disposed on a roadside, and may be configured to obtain roadside environment information, perform target identification, perform effective monitoring on a target in a coverage area, and the like. This is not limited in the embodiments of this application. For example, the environment information is at least one of a lane line, a roadside line, a zebra crossing, a sign indicator, a pedestrian, a vehicle, a railing, and a street lamp. The target is, for example, at least one object in the environment information. It should be noted that FIG. 2 shows only some environmental information by way of example, but the embodiments of this application are not limited to the scope shown in FIG. 2.

As shown in FIG. 2, the sensing system 200 may include a radar 110 and a camera 120, where the camera 120 may be a monocular camera. In addition, in this embodiment of this application, there may be one radar 110 in the sensing system 200, and there may be one camera 120.

A sensing area of the radar 110 may be, for example, an area that can be detected by the radar 110. In an example, the sensing area may be an area included in the dashed line 101 in FIG. 2 (which may also be referred to as an area 101). A sensing area of the camera 120 may be, for example, an area that can be photographed by the camera 120. In an example, the sensing area may be an area included in the dashed line 102 in FIG. 2 (which may also be referred to as an area 102).

In this embodiment of this application, areas covered by a radar and a camera in a same sensing station have an overlapping part, for example, a shadow area 103 in FIG. 2.

In this embodiment of this application, the sensing system 200 further includes a data fusion module. The radar 110 and the camera 120 may send collected data to the data fusion module in real time, and the data fusion module processes the received data to obtain a calibration parameter of the radar 110 and a calibration parameter of the camera 120. Herein, the calibration parameter of the radar 110 may also be referred to as a calibration value of a radar sensor, and the calibration parameter of the camera 120 may also be referred to as a calibration value of a camera sensor. However, the embodiments of this application are not limited thereto.

In some possible descriptions, the fusion processing module may also be referred to as a data fusion center, a calibration solving module, or the like. This is not limited in the embodiments of this application.

It should be noted that, in this embodiment of this application, measurement data in the area 103 of the radar 110 and the camera 120 may be calibrated.

In some possible implementations, the data fusion center may be located on a roadside, for example, integrated with the sensing station 200. In some possible implementations, the data fusion center may alternatively be disposed in the cloud. This is not limited in this embodiment of this application.

Figure 3:
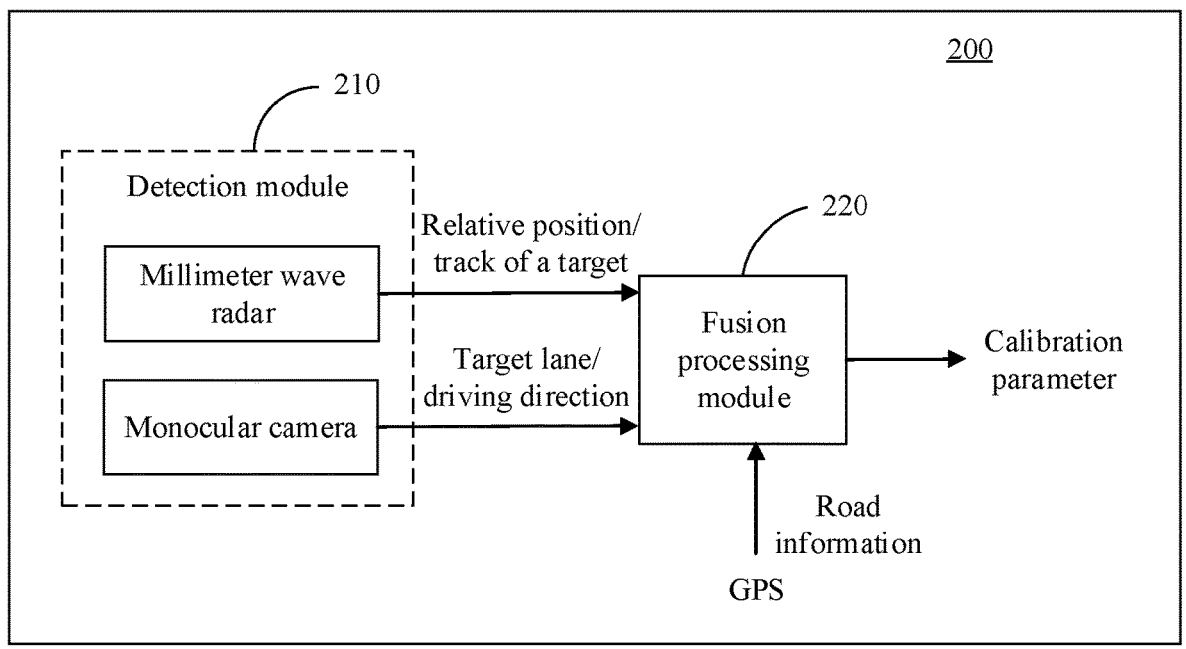
FIG. 3 is a schematic diagram of a sensing system according to an embodiment of this application.

FIG. 3 is a schematic diagram of a sensing system 200 according to an embodiment of this application. As shown in FIG. 3, the sensing system 200 may include a detection module 210 and a fusion processing module 220. The detection module 210 includes a millimeter wave radar and a monocular camera. Herein, the millimeter wave radar may be used as an example of the foregoing radar 110, and the monocular camera may be used as an example of the foregoing camera 120. For example, in some possible embodiments, the radar may alternatively be a laser radar.

In some possible implementations, the detection module 210 may be used for target detection, lane line detection, roadside detection, and the like. In an example, the monocular camera and the radar each may identify a target in a respective sensing area and obtain location information and other related information of the target. The monocular camera may obtain a real-time image of a road in the sensing area of the monocular camera, so as to identify left and right lane lines and the like of a lane in the image. The millimeter wave radar may identify obstacles in its sensing area, such as static obstacles that are continuous and regular such as a fence on each side of a road, to obtain information about a road edge (that is, a roadside line).

In a specific example, the monocular camera may identify a target of interest in the obtained image, and output information such as a lane in which the target is located or a driving direction to the fusion processing module 220. The millimeter wave radar may output a relative location or a track of the target (or another object) to the fusion processing module 220. Inputs of the fusion processing module 220 include detection information output by the millimeter wave radar and the monocular camera, and map information. The fusion processing module 220 fuses the input data to determine calibration parameters of the millimeter wave radar and the monocular camera. Then, the fusion processing module 220 may output the calibration parameter of the millimeter wave radar to the millimeter wave radar, and output the calibration parameter of the monocular camera to the monocular camera.

In an example, the map information may be current road information retrieved from a global positioning system (global positioning system, GPS) offline map database, or current road information in a GPS online map. Herein, the road information is, for example, longitude and latitude of a lane. This is not limited in the embodiments of this application.

Therefore, in this embodiment of this application, the fusion processing module 220 can determine the calibration parameters of the millimeter wave radar and the monocular camera based on the map information and the detection information that is output by the millimeter wave radar and the monocular camera. Therefore, according to the sensor space calibration solution provided in the embodiment of this application, for a sensing system that includes a single radar and a monocular camera, manual field calibration is no longer required, which can effectively improve calibration efficiency of sensors in the sensing system.

Figure 4:
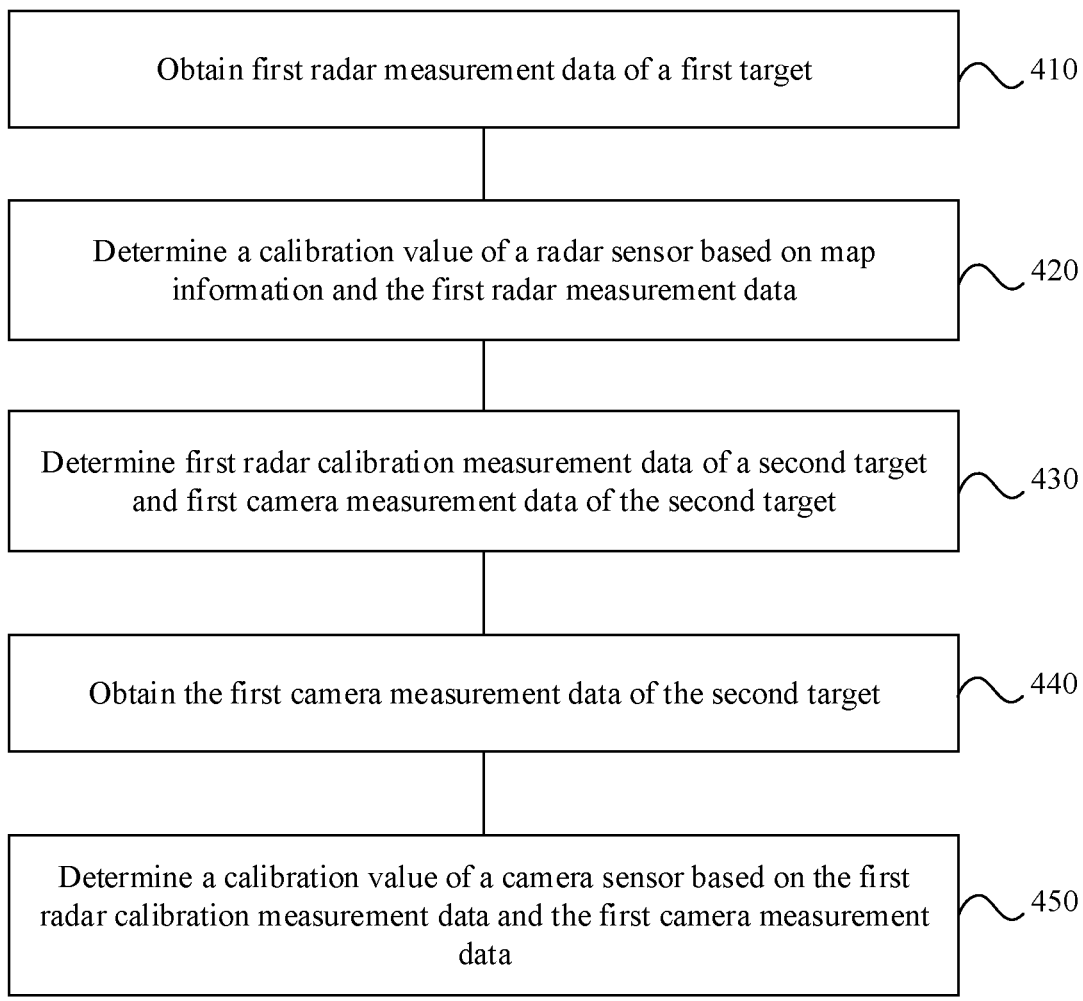
FIG. 4 is a schematic flowchart of a sensor calibration method according to an embodiment of this application.

FIG. 4 is a schematic flowchart of a sensor calibration method 400 according to an embodiment of this application. In an example, the method may be performed by the foregoing fusion processing module 220. The method includes steps 410 to 450.

410: Obtain first radar measurement data of a first target.

In a possible implementation, the first radar measurement data for the first target that is output by a radar may be obtained. Herein, the first target may be a roadside obstacle, and the first radar measurement data may be coordinates of the obstacle. For example, the first target may be a plurality of stationary point targets such as roadside fences, and the first radar measurement data is coordinates $[x_r(i), y_r(i)]$ of the plurality of stationary point targets. Herein, i represents a number of a stationary point. Herein, the first radar measurement data can represent information about a road edge (that is, a roadside line).

In another possible implementation, travelling data of the first target that is collected by a camera and radar measurement data that is collected by the radar may be first obtained, then radar measurement data that matches the travelling data of the first target is searched for in the radar measurement data collected by the radar, and the radar measurement data is used as the foregoing first radar measurement data.

In an example, a scene picture photographed by the camera may be obtained, and a target vehicle (an example of the first target) and travelling data of the target vehicle are obtained from the scene picture. For example, a quantity of vehicles in a scenario and a driving direction may be determined. When it is determined that the vehicles in the scenario are sparse (for example, there is only one vehicle in the scenario), one of the vehicles may be used as the target vehicle. After the target vehicle travels a distance along a lane, the camera may report driving data such as a driving direction, the driving lane, and a driving time of the target vehicle to the data fusion module 220.

The radar may further report radar observation data, that is, radar measurement data, to the data fusion module 220. Herein, the radar measurement data includes feature information such as a location, a speed, and a type of a target observed in a radar measurement scenario. Herein, the observed target may include roadside static obstacles that are continuous and regular, a vehicle, and the like. This is not limited in the embodiments of this application.

Correspondingly, the data fusion module 220 may receive, in real time, the camera measurement data reported by the camera and the radar measurement data reported by the radar. In some possible implementations, when receiving the travelling data of the target vehicle reported by the camera, the data fusion module 220 may obtain a first time period of travelling of the target vehicle, and then search radar measurement data corresponding to the first time period for location information of the target vehicle, for example, coordinates [$x_r(i)$, $y_r(i)$] of a position of the target vehicle, where i represents time.

It should be noted that the foregoing location coordinates [$x_r(i)$, $y_r(i)$] are coordinates of the first target in a local coordinate system of the radar.

In addition, the first target is located in both sensing areas of the camera and the radar, for example, the first target may be an object in the area 103 in FIG. 2.

In some possible implementations, the data fusion module 220 may alternatively search, based on the feature information provided by the radar such as the location, the speed, and the type of the observed target, the data reported by the camera for location information corresponding to the target.

420: Determine a calibration value of a radar sensor based on map information and the first radar measurement data.

In some possible implementations, a fitting straight line track of the first target may be determined based on the foregoing first radar measurement data, and then a first slope of the fitting straight line track of the first target is determined. Then, a second slope of a road reference target corresponding to the fitting straight line track of the first target may be determined based on the map information. In this case, the data fusion module 220 may determine the calibration value of the radar sensor based on the first slope and the second slope.

It should be noted that, in this embodiment of this application, the first slope is a slope of the fitting straight line track of the first target in the local coordinate system of the radar, and the second slope is a slope of the road reference target in a global coordinate system. In an example, when the map information is a GPS map, the global coordinate system may be a world coordinate system.

In an example, when the first radar measurement data represents information about a road edge (that is, a roadside line), a fitting straight line track of the road edge may be determined, and a first slope of the fitting straight line track is obtained. For example, when the first radar measurement data is coordinates [$x_r(i), y_r(i)$] of a plurality of stationary point targets, a linear regression equation may be used to calculate a fitting straight line track of the plurality of stationary points, and a first slope $b_r$ of the fitting straight line track is calculated. For example, $b_r$ may be shown in the following formula (1):

$$b_r = \frac{\sum_{i=1}^{n}(x_r(i) - \overline{x_r})(y_r(i) - \overline{y_r})}{\sum_{i=1}^{n}(x_r(i) - \overline{x_r})} \qquad (1)$$

Herein, n represents a quantity of sampling points, for example, may be a quantity of the plurality of stationary points. $\overline{x_r}$ and $\overline{y_r}$ are average numbers of $x_r(i)$ and $y_r(i)$ respectively.

Then, an included angle $\theta_r$ between the fitting straight line track and the $X_R$-axis of the local coordinate system of the radar may be determined. In an example, $\theta_r$ may be represented as the following formula (2):

$$\theta_r = \text{atan}\,(b_r) \qquad (2)$$

Then, a road corresponding to the fitting straight line track of the first target may be searched for in the map information, and a second slope of a reference target of the road is obtained. In an example in which the map information may be road information in the GPS map, after the road corresponding to the fitting straight line of the first target is found in the GPS map, a plurality of coordinate points may be selected on a left lane line or a right lane line of the road, a fitting straight line track corresponding to the plurality of coordinate points is obtained through fitting, and a second slope of the fitting straight line track is calculated.

For example, when position coordinates of the plurality of coordinate points are represented as [$x_l(j)$, $y_l(j)$], the second slope $b_l$ of the fitting straight line track corresponding to the plurality of coordinate points may be represented as the following formula (3):

$$b_l = \frac{\sum_{j=1}^{m}(x_l(j) - \overline{x_l})(y_l(j) - \overline{y_l})}{\sum_{j=1}^{m}(x_l(j) - \overline{x_l})} \qquad (3)$$

Herein, m represents a quantity of sampling points, for example, may be a quantity of the plurality of coordinate points. $\overline{x_l}$ and $\overline{y_l}$ are average numbers of $x_l(i)$ and $y_l(i)$ respectively.

Then, an included angle $\theta_l$ between the fitting straight line and the $X_G$-axis of the global coordinate system may be determined. In an example, $\theta_l$ may be represented as the following formula (4):

$$\theta_l = \text{atan}\,(b_l) \qquad (4)$$

Then, a calibration angle of the radar can be obtained by comparing $\theta_r$ with $\theta_l$. In an example, the calibration angle $\Delta\theta$ may be represented as the following formula (5):

$$\Delta\theta = \theta_l - \theta_r \qquad (5)$$

It should be noted that the foregoing formula is an example used to facilitate a person skilled in the art to understand the calibration solution of a sensor in the embodiments of this application, and constitutes no limitation on the embodiments of this application. For example, the calibration angle $\Delta\theta$ may alternatively be $\theta_r - \theta_l$. For another example, a person skilled in the art may alternatively obtain, in another manner or according to another formula, the fitting straight line track of the first target in the local coordinate system of the radar and the first slope, and/or the fitting straight line track of the road reference target corresponding to the fitting straight line track of the first target and the second slope. This is not limited in this embodiment of this application.

It should be noted that when the first radar measurement data represents information about a road edge (that is, a roadside line), a roadside stationary target position observed by using the radar is used as a calibration target. In this way, a sensing system does not have excessive requirements on a movement manner of a target obtained by the camera, and is more applicable to a road scenario with a fence, such as a highway.

In another example, when the first radar measurement data represents location information of the first target in the first time period, a fitting straight line track of positions of the first target in the first time period may be determined, and a first slope of the fitting straight line track is determined. Then, a road corresponding to the fitting straight line track of the first target may be searched for in the map information, and a second slope of a reference target of the road is determined. Then, the calibration angle of the radar is determined based on the first slope and the second slope. In some examples, the fitting straight line track of the first target is parallel to a side line of the road corresponding to the fitting straight line track of the first target, and therefore the first slope and the second slope are the same.

In an example, in this case, the first target may be a moving object, such as a vehicle, and the location information of the first target in the first time period is, for example, information such as location coordinates and a speed of the first target in the first time period. This is not limited in the embodiments of this application.

Specifically, for a process of determining the fitting straight line track of the positions of the first target in the first time period, and determining the first slope of the fitting straight line track, a process of determining the road corresponding to the fitting straight line track of the first target, and determining the second slope of the reference target of the road, and a process of determining the calibration angle of the radar based on the first slope and the second slope, refer to descriptions in the foregoing formulas (1) to (5). For brevity, details are not described herein again.

In another possible implementation, k first radar measurement values corresponding to k first targets may be obtained. Herein, the k first targets are corresponding to a same road reference target in the map information, and k is an integer greater than or equal to 2. Then, k fitting straight line tracks corresponding to the k first targets are determined based on the k first radar measurement values corresponding to the k first targets, and an average value of k first slopes corresponding to the k fitting straight line tracks is determined. Then, a second slope of the first road reference target may be determined based on the map information. In this case, the data fusion module 220 may determine the calibration value of the radar sensor based on the average value of the k first slopes and the second slope.

In an example, the foregoing k first targets are different targets at different moments in a same lane.

Specifically, for a process of determining the first radar measurement value corresponding to each first target, refer to the description in step 410. For brevity, details are not described herein again. In addition, for a process of determining, based on each first radar measurement value, the fitting straight line track corresponding to each first target, and determining the first slope of each fitting straight line track, refer to descriptions of the foregoing formula (1) and formula (2). For brevity, details are not described herein again.

For example, after the k first slopes corresponding to the k fitting straight line tracks are determined, the average value $\bar{\theta}_r$ of the k first slopes may be determined according to the following formula (6).

$$\bar{\theta}_r = \frac{1}{k}\Sigma_{i=1}^{k}\theta_r(i) \qquad (6)$$

Then, the calibration value of the radar sensor may be determined based on the average value $\bar{\theta}_r$ of the k first slopes and the second slope. Specifically, for a manner of determining the second slope, refer to descriptions of the foregoing formula (4) and formula (5). For brevity, details are not described herein again.

In an example, the calibration angle $\Delta\theta$ of the radar sensor may be represented as the following formula (7):

$$\Delta\theta=\theta_f-\bar{\theta}_r. \qquad (7)$$

It should be noted that the foregoing formula is an example used to facilitate a person skilled in the art to understand the calibration solution of a sensor in the embodiments of this application, and constitutes no limitation on the embodiments of this application. For example, the calibration angle $\Delta\theta$ may alternatively be $\theta_r-\tilde{\theta}_r$.

Therefore, in this embodiment of this application, the average value of the plurality of first slopes is determined after location information of the first target is measured for a plurality of times, and the calibration value of the radar sensor is determined based on the average value of the first slopes, thereby improving precision of the calibration value of the radar sensor.

430: Determine first radar calibration measurement data of a second target.

The first radar calibration measurement data is obtained based on second radar measurement data of the second target and the calibration value of the radar sensor determined in step 420, and may be used to determine location information of the second target in the world coordinate system. In an example, the radar may obtain the second radar measurement data of the second target, and then upload the second radar measurement data to the data fusion module 220. The data fusion module 220 determines radar calibration measurement data of the second target, that is, the first radar calibration measurement data, based on the second radar measurement data and the calibration value of the radar sensor.

In an example, the first radar calibration measurement data may be an AOA that is of the second target in the global coordinate system and obtained through calibration performed on an AOA measured by the radar. For example, when the AOA of the second target in the local coordinate system of the radar that is measured by the radar is $\hat{\varphi}$, the first radar calibration measurement data of the second target may be $(\hat{\varphi}+\Delta\theta)$.

In some possible implementations, for a second target that appears at different moments in a same location in images obtained by the camera, location information that is of the second target appearing at the different moments and observed by the radar may be further determined, and an average value of the plurality of pieces of location information is determined. Then, first radar calibration measurement data of the second target is determined based on the average value of the plurality of pieces of location information. Herein, the location information is location information of the second target in the local coordinate system of the radar. In an example, the location information may include, for example, a distance and an AOA.

It should be noted that, because the plurality of second targets are targets that appear at different moments in the same location obtained by the camera, camera measurement data corresponding to the plurality of second targets is the same.

Therefore, in this embodiment of this application, location information of the second target is measured for a plurality of times, and the average value of the location information of the plurality of second targets is determined. Then, first radar calibration measurement data of the second targets is determined based on the average value of the location information of the plurality of second targets. This can improve precision of radar calibration measurement data.

In a specific example, for h second targets that appear at h moments in a same location in images obtained by the camera, location information of the h second targets that is observed by the radar may be obtained, where h is an integer greater than or equal to 2. Then, an average value of the h pieces of location information may be determined. For example, the location information is a distance and an AOA. After the h pieces of location information of the h second targets in the local coordinate system of the radar are obtained, an average value $\tilde{d}$ of distances $\hat{d}$ in the h pieces of location information may be determined according to the following formula (8)

$$\tilde{d} = \frac{1}{h}\sum_{i=1}^{h} \hat{d}(i) \qquad (8)$$

An average value $\tilde{\varphi}$ of AOAs $\hat{\varphi}$ in the h pieces of location information may be determined according to the following formula (9):

$$\tilde{\varphi} = \frac{1}{h}\sum_{i=1}^{h} \hat{\varphi}(i) \qquad (9)$$

In this way, it may be determined that a first radar calibration measurement value corresponding to the second target may be $\tilde{\varphi}+\Delta\theta$.

440: Obtain first camera measurement data of the second target.

Herein, the camera may obtain camera measurement data of the second target, that is, the first camera measurement data. Then, the camera may send the first camera measurement data to the data fusion module 220. Correspondingly, the data fusion module 220 obtains the first camera measurement data. Herein, the first camera measurement data is used to indicate location information of the second target in a local coordinate system of the camera.

In some possible implementations, the data fusion module 220 may alternatively search, based on feature information such as a location, a speed, and a type that are of the second target and that are provided by the radar, data reported by the camera for the first camera measurement data, that is, search for the location information of the second target in the local coordinate system of the camera.

It should be noted that the second target needs to be located in both the sensing areas of the camera and the radar, for example, may be an object in the area 103 in FIG. 2.

In some possible implementations, the first target and the second target may be same objects, but implementation of this application is not limited thereto.

450: Determine a calibration value of a camera sensor based on the first radar calibration measurement data in step 430 and the first camera measurement data in step 440.

In some possible embodiments, location information of the second target in the world coordinate system may be determined based on the foregoing first radar calibration measurement data, and then the calibration value of the camera sensor is determined based on the first camera measurement data and the location information of the second target in the world coordinate system. In an example, calibration point coordinates in the global coordinate system that are corresponding to a pixel of the second target in the local coordinate system of the camera are the location information of the second target in the world coordinate system.

In a specific example, location information of the second target in the world coordinate system at a moment w may be determined based on location information of the second target in the local coordinate system of the radar at the moment w, which may be specifically shown in the following formula (10):

$$\begin{cases} \hat{x}(w) = \hat{d}(w) * \cos(\hat{\varphi}(w) + \Delta\theta) + x_{rad} \\ \hat{y}(w) = \hat{d}(w) * \sin(\hat{\varphi}(w) + \Delta\theta) + y_{rad} \end{cases} \qquad (10)$$

Herein, $\hat{d}(w)$ represents a distance between the radar and the second target observed by the radar at the moment w, $\hat{\varphi}(w)$ represents an AOA of the second target in the local coordinate system of the radar at the moment w, $\Delta\theta$ represents a calibration angle of the radar sensor, and $[x_{rad}, y_{rad}]$ represents a location of the radar in the global coordinate system.

For example, the pixel of the second target in the camera may be represented as (u, v). In this case, the location information in the global coordinate system that is corresponding to the pixel (u,v) may be $[\hat{x}(w), \hat{y}(w)]$.

In another specific example, location information of a plurality of second targets in the world coordinate system may be determined based on an average value of a plurality of pieces of location information of the plurality of second targets in the local coordinate system of the radar, which may be specifically shown in the following formula (11):

$$\begin{cases} \tilde{x} = \tilde{d} * \cos(\tilde{\varphi} + \Delta\theta) + x_{rad} \\ \tilde{y} = \tilde{d} * \sin(\tilde{\varphi} + \Delta\theta) + y_{rad} \end{cases} \qquad (11)$$

For example, a pixel of the second target in the camera may be represented as (u,v). In this case, location information in the global coordinate system that is corresponding to the pixel (u,v) may be $[\tilde{x}, \tilde{y}]$.

In some possible implementations, a plurality of pieces of first radar calibration measurement data corresponding to a second target that appears at different moments in a same location in images obtained by the camera may be further obtained. Then, a plurality of pieces of location information of the plurality of second targets in the world coordinate system may be determined based on the plurality of pieces of first radar calibration measurement data, and an average value of the plurality of pieces of location information may be determined. Then, the calibration value of the camera sensor may be determined based on the average value of the plurality of pieces of location information and first camera measurement data corresponding to the plurality of second targets.

In a specific example, for h second targets that appear at h moments in a same location in images obtained by the camera, after location information of the h second targets that is observed by the radar is determined, first radar calibration measurement data of the h second targets may be determined. For example, the first radar calibration measurement data of each second target may be represented as ($\hat{\varphi}(i)+\Delta\theta$).

Specifically, for a process of determining the first radar calibration measurement value corresponding to each second target, refer to the description in step 430. For brevity, details are not described herein again.

Then, h pieces of location information of the h second targets in the world coordinate system may be determined based on the h pieces of first radar calibration measurement data of the h second targets. In an example, the h pieces of location information may be represented as the following formula (12):

$$\begin{cases} \hat{x}(i) = \hat{d}(i) * \cos(\hat{\varphi}(i) + \Delta\theta) + x_{rad} \\ \hat{y}(i) = \hat{d}(i) * \sin(\hat{\varphi}(i) + \Delta\theta) + y_{rad} \end{cases} \quad (12)$$

Herein, a value of i may be 1, ..., h.

An average value of the h pieces of location information of the h second targets may be represented as the following formula (13):

$$\begin{cases} \bar{x} = \frac{1}{h}\Sigma_{i=1}^{h} \hat{x}(i) \\ \bar{y} = \frac{1}{h}\Sigma_{i=1}^{h} \hat{y}(i) \end{cases} \quad (13)$$

For example, a pixel of the second target in the camera may be represented as (u,v). In this case, location information in the global coordinate system that is corresponding to the pixel (u,v) may be [x̃,ỹ].

Therefore, in this embodiment of this application, location information of the second target is measured for a plurality of times, a plurality of pieces of location information in the world coordinate system that are corresponding to the location information of the plurality of second targets are determined, and then an average value of the plurality of pieces of location information of the plurality of second targets in the world coordinate system is determined. Then, the calibration value of the camera sensor is determined based on the average value. This can improve precision of the calibration value of the camera sensor.

In some possible implementations of this application, location information of at least one pixel of the second target in the global coordinate system may be obtained in the foregoing manner, and then a conversion relationship between a location of a target in the local coordinate system of the camera 120 and a location of the target in the global coordinate system, that is, the calibration parameter of the camera, may be determined based on location information of the at least one pixel in the local coordinate system of the camera and the location information of the at least one pixel in the global coordinate system. In an example, the conversion relationship may be determined based on location information of nine pixels of the second target in the local coordinate system of the camera and location information of the nine pixels in the global coordinate system. However, the embodiments of this application are not limited thereto.

Therefore, in this embodiment of this application, location information of a target detected by the radar is matched against the map information to determine the calibration value of the radar sensor, and then location information of a pixel of a target corresponding to the camera in the global coordinate system may be determined based on calibrated radar measurement data, that is, radar calibration measurement data, so as to further determine the calibration value of the camera sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

Figure 5:
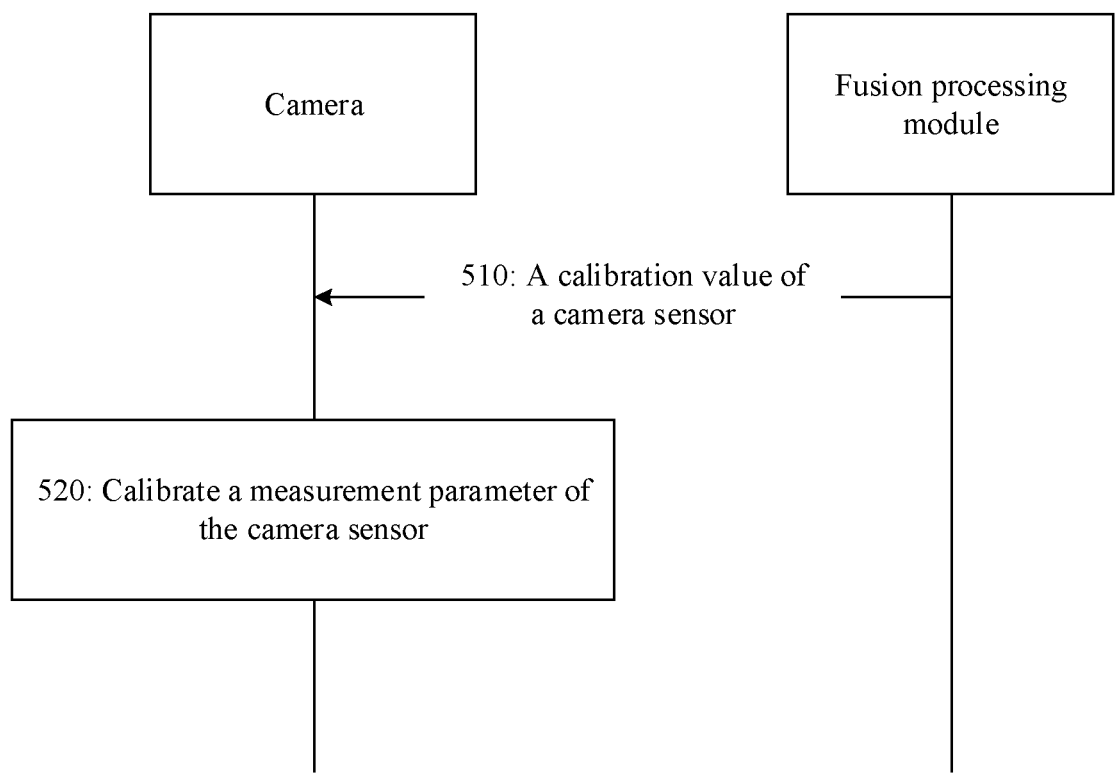
FIG. 5 is a schematic flowchart of another sensor calibration method according to an embodiment of this application.

FIG. 5 is a schematic flowchart of another sensor calibration method 500 according to an embodiment of this application. In an example, the method includes steps 510 and 520.

510: A fusion processing module sends a calibration value of a sensor of a camera to the camera. Correspondingly, the camera receives the calibration value of the camera sensor that is sent by the fusion processing module. The calibration value of the camera sensor is obtained based on first radar calibration measurement data of a second target and first camera measurement data of the second target, and the first radar calibration measurement data is obtained based on second radar measurement data of the second target and a calibration value of the radar sensor.

Specifically, for a process of determining the calibration value of the camera sensor, refer to the foregoing description in FIG. 4. For brevity, details are not described herein again.

520: The camera calibrates a measurement parameter of the camera sensor based on the calibration value of the camera sensor.

Specifically, the camera may convert the measurement parameter of the camera sensor from a local coordinate system of the camera to a global coordinate system based on the calibration value of the camera sensor.

Therefore, in this embodiment of this application, the camera may receive the calibration value of the camera sensor sent by the fusion processing module, and then may calibrate the measurement parameter of the camera sensor based on the calibration value of the camera sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

In some possible implementations, the camera may further obtain camera measurement data of a plurality of targets, then determine, based on the camera measurement data of the plurality of targets, a first target that meets a preset reporting condition in the plurality of targets, and obtain travelling data of the first target. Then, the camera sends the travelling data of the first target to the fusion processing module. The travelling data is used to indicate the fusion module to search radar measurement data collected by the radar sensor for first radar measurement data that is of the first target and matches the travelling data.

In an example, the preset reporting condition is that vehicles in a scene picture photographed by the camera are sparse, for example, only one vehicle exists. In this case, the vehicle may be used as the first target. For details, refer to the description of 410 in FIG. 4. For brevity, details are not described herein again.

Figure 6:
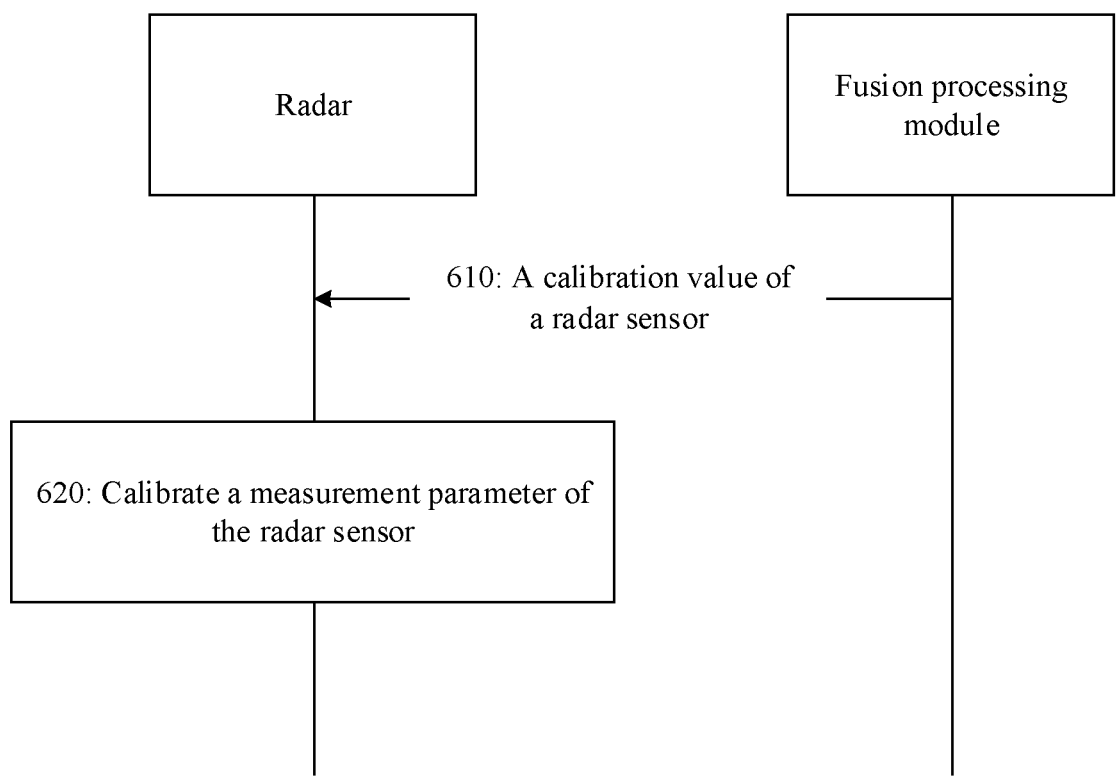
FIG. 6 is a schematic flowchart of another sensor calibration method according to an embodiment of this application.

FIG. 6 is a schematic flowchart of another sensor calibration method 600 according to an embodiment of this application. In an example, the method includes steps 610 and 620.

610: Receive a calibration value of a radar sensor sent by a fusion processing module, where the calibration value of the radar sensor is obtained based on first radar measurement data of a first target and map data.

620: Calibrate a measurement parameter of the radar sensor based on the calibration value of the radar sensor.

Therefore, in this embodiment of this application, the radar may receive the calibration value of the radar sensor sent by the fusion processing module, and then may calibrate the measurement parameter of the radar sensor based on the calibration value of the radar sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

Figure 7:
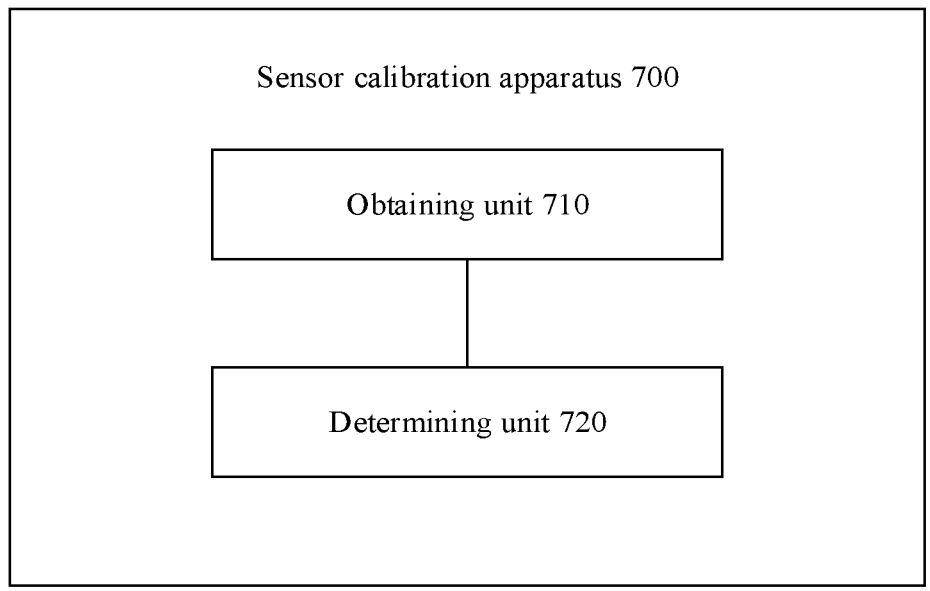
FIG. 7 is a schematic block diagram of a sensor calibration apparatus according to an embodiment of this application.

FIG. 7 is a schematic block diagram of a sensor calibration apparatus 700 according to an embodiment of this application. In an example, the apparatus 700 may be the foregoing fusion processing module. The apparatus 700 includes an obtaining unit 710 and a determining unit 720.

The obtaining unit 710 is configured to obtain first radar measurement data of a first target.

The determining unit 720 is configured to determine a calibration value of a radar sensor based on map information and the first radar measurement data.

The determining unit 720 is further configured to determine first radar calibration measurement data of a second target, where the first radar calibration measurement data is obtained based on second radar measurement data of the second target and the calibration value of the radar sensor.

The obtaining unit 710 is further configured to obtain first camera measurement data of the second target.

The determining unit 720 is further configured to determine a calibration value of a camera sensor based on the first radar calibration measurement data and the first camera measurement data.

In some possible implementations, the determining unit 720 is specifically configured to: determine a fitting straight line track of the first target based on the first radar measurement data; determine a first slope of the fitting straight line track of the first target; determine, based on the map information, a second slope of a first road reference target in a world coordinate system, where the first road reference target is corresponding to the fitting straight line track of the first target; and determine the calibration value of the radar sensor based on the first slope and the second slope.

In some possible implementations, the determining unit 720 is specifically configured to: obtain k first radar measurement values corresponding to k first targets, where the k first targets are corresponding to a first road reference target in the map information, and k is an integer greater than or equal to 2; determine, based on n first radar measurement values corresponding to the k first targets, k fitting straight line tracks corresponding to the k first targets; determine an average value of k first slopes corresponding to the k fitting straight line tracks; determine a second slope of the first road reference target in a world coordinate system based on the map information; and determine the calibration value of the radar sensor based on the average value of the k first slopes and the second slope.

In some possible implementations, the determining unit 720 is specifically configured to: determine location information of the second target in the world coordinate system based on the first radar calibration measurement data; and determine the calibration value of the camera sensor based on the first camera measurement data and the location information of the second target in the world coordinate system.

In some possible implementations, the determining unit 720 is specifically configured to: obtain h pieces of first radar calibration measurement data corresponding to h second targets and h pieces of first camera measurement data of the h second targets, where the first camera measurement data of the h second targets is the same, and h is an integer greater than or equal to 2; determine h pieces of location information of the h second targets in the world coordinate system based on the h pieces of first radar calibration measurement data of the h second targets; determine an average value of the h pieces of location information of the h second targets; and determine the calibration value of the camera sensor based on the average value of the h pieces of location information of the h second targets and the h pieces of first camera measurement data of the h second targets.

In some possible implementations, the obtaining unit 710 is specifically configured to: obtain travelling data of the first target collected by the camera sensor; and search radar measurement data collected by the radar sensor for the first radar measurement data that matches the travelling data.

In some possible implementations, the apparatus 700 may further include a sending unit, configured to send the determined calibration value of the radar sensor to the radar, and send the calibration value of the camera sensor to the camera.

Therefore, in this embodiment of this application, location information of a target detected by the radar is matched against the map information to determine the calibration value of the radar sensor, and then location information of a pixel of a target corresponding to the camera in the global coordinate system may be determined based on calibrated radar measurement data, that is, radar calibration measurement data, so as to further determine the calibration value of the camera sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

In this embodiment, the obtaining unit 710 may be implemented by a receiver, and the determining unit 720 may be implemented by a processor.

The sensor calibration apparatus 700 shown in FIG. 7 can implement processes corresponding to the foregoing method embodiment shown in FIG. 4. Specifically, for the sensor calibration apparatus 700, refer to the foregoing description in FIG. 4. To avoid repetition, details are not described herein again.

Figure 8:
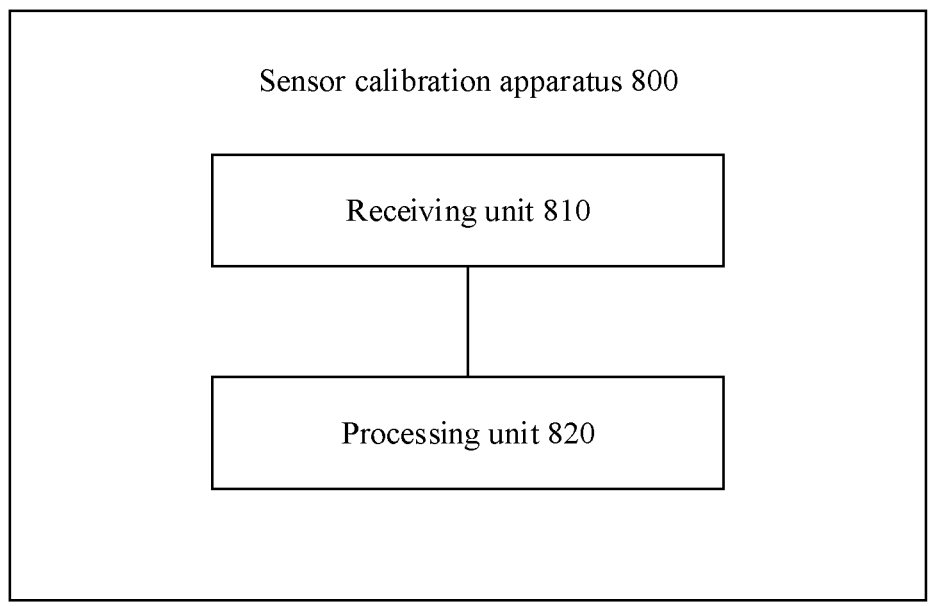
FIG. 8 is a schematic block diagram of another sensor calibration apparatus according to an embodiment of this application.

FIG. 8 is a schematic block diagram of another sensor calibration apparatus 800 according to an embodiment of this application. In an example, the apparatus 800 may be the foregoing camera. The apparatus 800 includes a receiving unit 810 and a processing unit 820.

The receiving unit 810 is configured to receive a calibration value of a camera sensor sent by a fusion processing module, where the calibration value of the camera sensor is obtained based on first radar calibration measurement data of a second target and first camera measurement data of the second target, and the first radar calibration measurement data is obtained based on second radar measurement data of the second target and a calibration value of the radar sensor.

The processing unit 820 is configured to calibrate the measurement parameter of the camera sensor based on the calibration value of the camera sensor.

In some possible implementations, the apparatus 800 further includes: an obtaining unit, configured to obtain camera measurement data of a plurality of targets, where the processing unit 820 is further configured to determine, from the plurality of targets based on the camera measurement data of the plurality of targets that is obtained by the obtaining unit, a first target that meets a preset reporting condition, and the obtaining unit is further configured to obtain travelling data of the first target; and a sending unit, configured to send the travelling data of the first target to the fusion processing module, where the travelling data is used to indicate the fusion module to search radar measurement data collected by the radar sensor for first radar measurement data that is of the first target and matches the travelling data.

Therefore, in this embodiment of this application, the camera may receive the calibration value of the camera sensor sent by the fusion processing module, and then may calibrate the measurement parameter of the camera sensor based on the calibration value of the camera sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

In this embodiment, the receiving unit 810 may be implemented by a receiver, and the processing unit 820 may be implemented by a processor.

The sensor calibration apparatus 800 shown in FIG. 8 can implement processes corresponding to the foregoing method embodiment shown in FIG. 5. Specifically, for the sensor calibration apparatus 800, refer to the foregoing description in FIG. 5. To avoid repetition, details are not described herein again.

Figure 9:
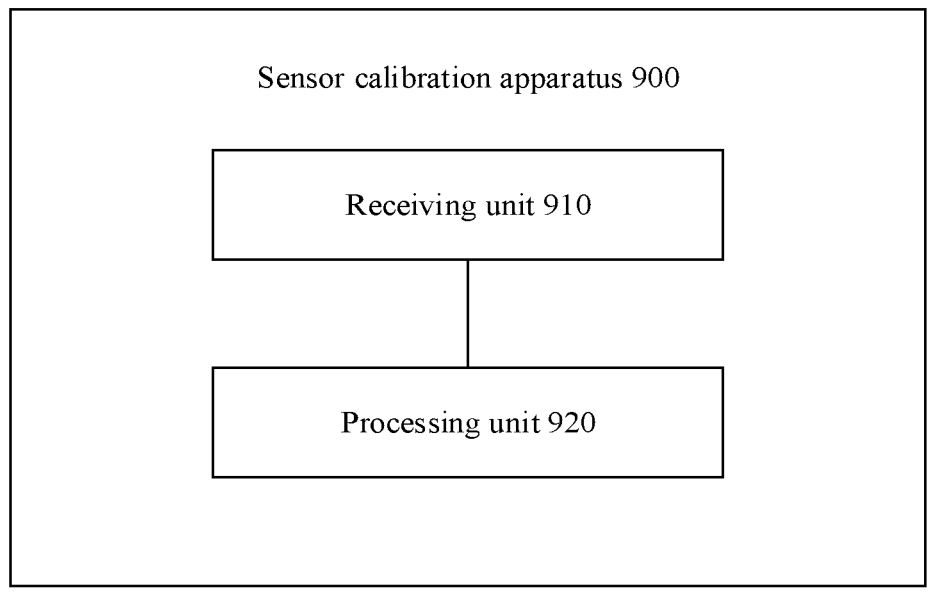
FIG. 9 is a schematic block diagram of another sensor calibration apparatus according to an embodiment of this application.

FIG. 9 is a schematic block diagram of a sensor calibration apparatus 900 according to an embodiment of this application. In an example, the apparatus 900 may be the foregoing radar. The apparatus 900 includes a receiving unit 910 and a processing unit 920.

The receiving unit 910 is configured to receive a calibration value of a radar sensor sent by a fusion processing module, where the calibration value of the radar sensor is obtained based on first radar measurement data of a first target and map data.

The processing unit 920 is configured to calibrate a measurement parameter of the radar sensor based on the calibration value of the radar sensor.

Therefore, in this embodiment of this application, the radar may receive the calibration value of the radar sensor sent by the fusion processing module, and then may calibrate the measurement parameter of the radar sensor based on the calibration value of the radar sensor. Therefore, according to the sensor space calibration solution provided in the embodiment of this application, for a sensing system that includes a single radar and a monocular camera, manual field calibration is no longer required, which can effectively improve calibration efficiency of sensors in the sensing system.

Figure 10:
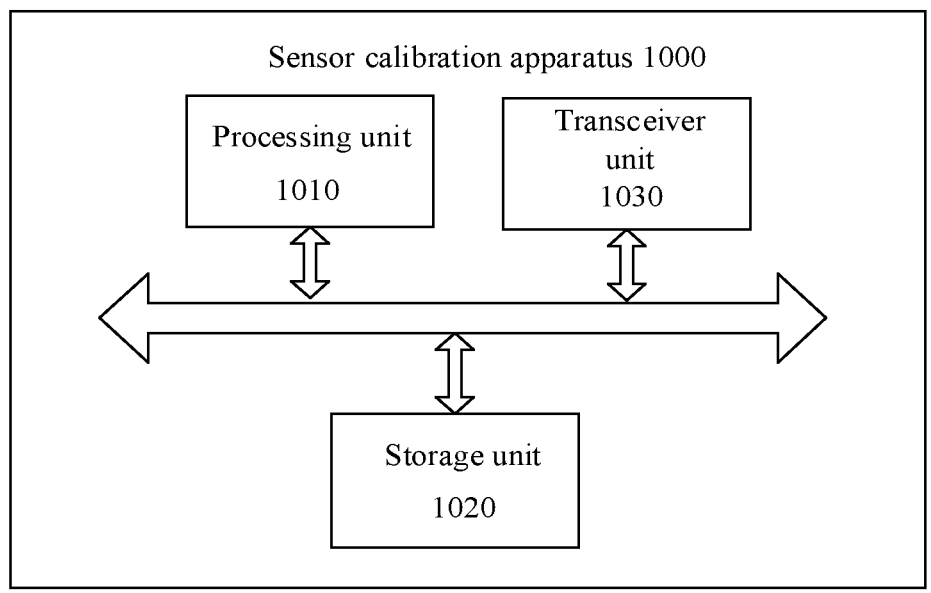
FIG. 10 is a schematic block diagram of another sensor calibration apparatus according to an embodiment of this application.

FIG. 10 is a schematic block diagram of a sensor calibration apparatus 1000 according to an embodiment of this application. In an example, the apparatus 1000 may be a fusion processing module, a camera, or a radar. As shown in FIG. 10, the apparatus 1000 may include a processor 1010 and a transceiver 1030. Optionally, the apparatus 1000 may further include a memory 1020.

The memory 1020 may be configured to store instructions or code used by the processor 1010 to execute the sensor calibration method, or a calibration parameter for calibrating the sensor, or intermediate data used in a process of determining the calibration parameter. The processor 1010 may be configured to execute the instructions stored in the memory 1020, to enable the apparatus 1000 to implement steps performed by the fusion processing module, the camera, or the radar in the foregoing method. Alternatively, the processor 1010 may be configured to invoke data of the memory 1020, to enable the apparatus 1000 to implement steps performed by the fusion processing module, the camera, or the radar in the foregoing method.

For example, the processor 1010, the memory 1020, and the transceiver 1030 may use an internal connection channel to communicate with each other, and transmit control and/or data signals. For example, the memory 1020 is configured to store a computer program, and the processor 1010 may be configured to invoke and run the computer program from the memory 1020, to control the transceiver 1030 to receive a signal and/or send a signal, so as to complete steps corresponding to the foregoing method. The memory 1020 may be integrated into the processor 1010, or may be separated from the processor 1010.

In an implementation, it may be considered that a function of the transceiver 1030 is implemented by using a transceiver circuit or a special-purpose transceiver chip. It may be considered that the processor 1010 is implemented by using a dedicated processing chip, a processing circuit, a processing unit, or a general-purpose chip.

In another implementation, a general-purpose computer may be used to implement the sensor calibration apparatus provided in the embodiment of this application. That is, program code for implementing functions of the processor 1010 and the transceiver 1030 is stored in the memory 1020. A general-purpose processing unit implements functions of the processor 1010 and the transceiver 1030 by executing the code in the memory 1020.

For example, when the apparatus 1000 is configured in a fusion processing module or is a fusion processing module, modules or units in the apparatus 1000 may be configured to execute actions or processing processes executed by the fusion processing module in the foregoing method. To avoid repeated description herein, detailed description thereof is omitted.

For example, when the apparatus 1000 is configured in a camera or is a camera, modules or units in the apparatus 1000 may be configured to execute actions or processing processes executed by the camera in the foregoing method. To avoid repeated description herein, detailed description thereof is omitted.

For example, when the apparatus 1000 is configured in a radar or is a radar, modules or units in the apparatus 1000 may be configured to execute actions or processing processes executed by the radar in the foregoing method. To avoid repeated description herein, detailed description thereof is omitted.

For concepts, explanations, detailed descriptions, and other steps of the apparatus 1000 that are related to the technical solutions provided in the embodiments of this application, refer to the descriptions of the content in the foregoing methods or other embodiments. Details are not described herein again.

The processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor, or the like.

The memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) that is used as an external cache. By way of example but not limitative description, many forms of RAMs may be used, for example, a static random access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a SynchLink dynamic random-access memory (SLDRAM), and a direct Rambus random-access memory (DR RAM).

It should be noted that, when the processor is a general-purpose processor, a DSP, an ASIC, an FPGA or another programmable logic device, a discrete gate or a transistor logic device, or a discrete hardware component, the memory (a storage module) is integrated into the processor.

It should be noted that, the memory described in this specification is intended to include but is not limited to these memories and any other appropriate types of memories.

An embodiment of this application further provides a computer-readable storage medium. The computer-readable storage medium includes a computer program. When the computer program is run on a computer, the computer is enabled to perform the methods provided in the foregoing method embodiments.

An embodiment of this application further provides a computer program product including instructions. When the computer program product runs on a computer, the computer is enabled to perform the methods provided in the foregoing method embodiments.

An embodiment of this application further provides a chip, including a processor and a communications interface. The processor is configured to invoke and run instructions from the communications interface. When the processor executes the instructions, the method provided in the foregoing method embodiment is implemented.

It should be understood that sequence numbers of the foregoing processes do not mean execution sequences in the embodiments of this application. The execution sequences of the processes should be determined based on functions and internal logic of the processes, and should not be construed as any limitation on implementation processes of the embodiments of this application.

It should be understood that the descriptions of "first", "second", and the like in the embodiments of this application are merely used to illustrate and distinguish description objects, and there is no sequence. The descriptions of "first", "second", and the like do not represent a special limitation on a quantity of devices in the embodiments of this application, and cannot constitute any limitation on the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sensor calibration method, comprising:
   obtaining first radar measurement data of a first target;
   determining a first slope of a fitting straight line track of the first target based on the first radar measurement data;
   determining, based on map information, a second slope of a first road reference target in a world coordinate system;
   determining a first calibration value of a radar sensor based on the first slope and the second slope;
   determining first radar calibration measurement data of a second target based on second radar measurement data of the second target and the first calibration value, wherein location information of the second target in a world coordinate system is based on the first radar calibration measurement data;
   obtaining first camera measurement data of the second target; and
   determining a second calibration value of a camera sensor based on the location information and the first camera measurement data.

2. The sensor calibration method of claim 1, wherein the first road reference target corresponds to the fitting straight line track.

3. The sensor calibration method of claim 2, wherein determining the second calibration value comprises:
obtaining h pieces of the first radar calibration measurement data corresponding to h second targets and h pieces of the first camera measurement data of the h second targets, wherein the h pieces of the first camera measurement data are the same, and wherein the h is an integer greater than or equal to 2;
determining h pieces of location information of the h second targets in the world coordinate system based on the h pieces of the first radar calibration measurement data;
determining an average value of the h pieces of location information; and
determining the second calibration value based on the average value of the h pieces of location information and the h pieces of the first camera measurement data.

4. The sensor calibration method of claim 1, wherein determining the first calibration value comprises:
obtaining first radar measurement values corresponding to k first targets, wherein the k first targets correspond to a first road reference target in the map information, and wherein k is an integer greater than or equal to 2;
determining, based on the first radar measurement values, k fitting straight line tracks corresponding to the k first targets;
determining an average value of k first slopes corresponding to the k fitting straight line tracks;
determining a second slope of the first road reference target in a world coordinate system based on the map information; and
determining the first calibration value based on the average value.

5. The sensor calibration method of claim 1, wherein determining the second calibration value comprises:
obtaining h pieces of the first radar calibration measurement data corresponding to h second targets and h pieces of the first camera measurement data of the h second targets, wherein the h pieces of the first camera measurement data are the same, and wherein the h is an integer greater than or equal to 2;
determining h pieces of location information of the h second targets in a world coordinate system based on the h pieces of the first radar calibration measurement data;
determining an average value of the h pieces of location information; and
determining the second calibration value based on the average value and the h pieces of the first camera measurement data.

6. The sensor calibration method of claim 1, wherein obtaining the first radar measurement data comprises:
obtaining travelling data of the first target from the camera sensor; and
searching radar measurement data collected by the radar sensor for the first radar measurement data that matches the travelling data.

7. The sensor calibration method of claim 1, further comprising calibrating a measurement parameter of the camera sensor based on the second calibration value.

8. A sensor calibration apparatus, comprising:
a memory configured to store instructions; and
one or more processors coupled to the memory and configured to execute the instructions to cause the sensor calibration apparatus to:
obtain first radar measurement data of a first target;
determine a first slope of a fitting straight line track of the first target based on the first radar measurement data;
determine, based on map information, a second slope of a first road reference target in a world coordinate system;
determine a first calibration value of a radar sensor based on the first slope and the second slope;
determine first radar calibration measurement data of a second target based on second radar measurement data of the second target and the first calibration value, wherein location information of the second target in a world coordinate system based on the first radar calibration measurement data;
obtain first camera measurement data of the second target; and
determine a second calibration value of a camera sensor based on the location information and the first camera measurement data.

9. The sensor calibration apparatus of claim 8, wherein the first road reference target corresponds to the fitting straight line track.

10. The sensor calibration apparatus of claim 9, wherein when executed by the one or more processors, the instructions are further configured to cause the sensor calibration apparatus to:
obtain h pieces of the first radar calibration measurement data corresponding to h second targets and h pieces of the first camera measurement data of the h second targets, wherein the h pieces of the first camera measurement data are the same, and wherein the h is an integer greater than or equal to 2;
determine h pieces of location information of the h second targets in the world coordinate system based on the h pieces of the first radar calibration measurement data;
determine an average value of the h pieces of location information; and
further determine the second calibration value of the camera sensor based on the average value and the h pieces of the first camera measurement data.

11. The sensor calibration apparatus of claim 8, wherein when executed by the one or more processors, the instructions are further configured to cause the sensor calibration apparatus to:
obtain first radar measurement values corresponding to k first targets, wherein the k first targets correspond to a first road reference target in the map information, and wherein k is an integer greater than or equal to 2;
determine, based on the first radar measurement values, k fitting straight line tracks corresponding to the k first targets;
determine an average value of k first slopes corresponding to the k fitting straight line tracks;
determine a second slope of the first road reference target in a world coordinate system based on the map information; and
further determine the first calibration value based on the average value.

12. The sensor calibration apparatus of claim 8, wherein when executed by the one or more processors, the instructions are further configured to cause the sensor calibration apparatus to:

obtain h pieces of the first radar calibration measurement data corresponding to h second targets and h pieces of the first camera measurement data of the h second targets, wherein the h pieces of the first camera measurement data are the same, and wherein the h is an integer greater than or equal to 2;

determine h pieces of location information of the h second targets in a world coordinate system based on the h pieces of the first radar calibration measurement data;

determine an average value of the h pieces of location information; and further determine the second calibration value based on the average value and the h pieces of the first camera measurement data.

13. The sensor calibration apparatus of claim 8, wherein when executed by the one or more processors, the instructions are further configured to cause the sensor calibration apparatus to:

obtain travelling data of the first target from the camera sensor; and search radar measurement data collected by the radar sensor for the first radar measurement data that matches the travelling data.

14. A sensor calibration apparatus, comprising:

a memory configured to store instructions; and one or more processors coupled to the memory and configured to execute the instructions to cause the sensor calibration apparatus to:

receive a first calibration value of a camera sensor from a fusion processor, wherein the first calibration value is based on first radar calibration measurement data of a second target and first camera measurement data of the second target, wherein location information of the second target in a world coordinate system is based on the first radar calibration measurement data, wherein the first radar calibration measurement data is based on first radar measurement data of the second target and a second calibration value of a radar sensor, wherein the second calibration value is based on a first slope of a fitting straight line track of a first target and a second slope of a first road reference target in the world coordinate system, wherein the fitting straight line track is based on the first camera measurement data, and wherein the second slope is based on map information; and calibrate a measurement parameter of the camera sensor based on the first calibration value.

15. The sensor calibration apparatus of claim 14, wherein when executed by the one or more processors, the instructions further cause the sensor calibration apparatus to:

obtain second camera measurement data of a plurality of targets;

determine, from the plurality of targets based on the second camera measurement data, a third target that meets a preset reporting condition;

obtain travelling data of the first target, wherein the travelling data indicates to the fusion processor to search second radar measurement data from the radar sensor for third radar measurement data that is of the first target and that matches the travelling data; and send the travelling data to the fusion processor.

16. The sensor calibration apparatus of claim 14, wherein the camera sensor is a monocular camera, and wherein the radar sensor comprises a millimeter wave radar.

17. The sensor calibration apparatus of claim 14, wherein when executed by the one or more processors, the instructions further cause the sensor calibration apparatus to receive the second calibration value of the radar sensor from the fusion processor.

18. The sensor calibration apparatus of claim 14, wherein the radar sensor and the camera sensor are disposed on a roadside.

19. The sensor calibration apparatus of claim 14, wherein the fusion processor is disposed on a roadside.

20. The sensor calibration apparatus of claim 14, wherein the fusion processor is disposed in the cloud.

\* \* \* \* \*